(12) United States Patent
Berot et al.

(10) Patent No.: US 8,219,317 B2
(45) Date of Patent: Jul. 10, 2012

(54) ROUTE NAVIGATION VIA A PROXIMITY POINT

(75) Inventors: Olivier Berot, Plesse (FR); Simon Louvet, Reze (FR)

(73) Assignee: Mitac International Corporation, Kuei San Hsiang, Taoyuan (TW)

(*) Notice: Subject to any disclaimer, the term of this patent is extended or adjusted under 35 U.S.C. 154(b) by 930 days.

(21) Appl. No.: 12/192,018

(22) Filed: Sep. 22, 2008

(65) Prior Publication Data

US 2010/0076674 A1 Mar. 25, 2010

(51) Int. Cl.
*G01C 21/34* (2006.01)

(52) U.S. Cl. .......................... 701/425; 701/10

(58) Field of Classification Search .......... 701/25, 701/201, 202, 206, 410, 411, 425, 426
See application file for complete search history.

(56) References Cited

U.S. PATENT DOCUMENTS

| | | | |
|---|---|---|---|
| 5,515,283 A | 5/1996 | Desai et al. | |
| 5,802,492 A | 9/1998 | DeLorme et al. | |
| 5,938,720 A | * 8/1999 | Tamai | 701/209 |
| 6,049,755 A | 4/2000 | Lou et al. | |
| 6,067,502 A | 5/2000 | Hayashida et al. | |
| 6,078,864 A | 6/2000 | Long et al. | |
| 6,081,609 A | 6/2000 | Narioka | |
| 6,084,989 A | 7/2000 | Eppler | |
| 6,092,076 A | 7/2000 | McDonough et al. | |
| 6,107,944 A | 8/2000 | Behr et al. | |
| 6,108,603 A | 8/2000 | Karunanidhi | |
| 6,108,604 A | 8/2000 | Fakaga et al. | |
| 6,115,669 A | 9/2000 | Watanabe et al. | |
| 6,124,826 A | 9/2000 | Garthwaite et al. | |
| 6,125,326 A | 9/2000 | Ohmura et al. | |
| 6,141,621 A | 10/2000 | Piwowarski et al. | |
| 6,148,261 A | 11/2000 | Obradovich et al. | |
| 6,151,552 A | 11/2000 | Koizumi et al. | |
| 6,154,699 A | 11/2000 | Williams | |
| 6,163,269 A | 12/2000 | Millington et al. | |
| 6,172,641 B1 | 1/2001 | Millington | |
| 6,175,801 B1 | 1/2001 | Millington | |
| 6,177,943 B1 | 1/2001 | Margolin | |
| 6,178,380 B1 | 1/2001 | Millington | |
| 6,184,823 B1 | 2/2001 | Smith et al. | |

(Continued)

FOREIGN PATENT DOCUMENTS

JP 2001194172 7/2001

(Continued)

OTHER PUBLICATIONS

International Patent Application No. PCT/US2008/084659, Written Opinion and International Search Report, Apr. 28, 2009.

(Continued)

*Primary Examiner* — Joseph C Rodriguez

(74) *Attorney, Agent, or Firm* — Winston Hsu; Scott Margo

(57) ABSTRACT

A system and method is provided that uses one or more points, e.g., "smart via" input points, e.g., a center of a city such as a large city, to determine one or more points, e.g., smart via output points. A smart via output point determined from a smart via input point can be used, together with origination and destination points, to identify an optimal navigational route between the origination and destination points. A navigational route generated using the smart via output point, an origination point and a destination point travels in proximity to the smart via input point.

14 Claims, 13 Drawing Sheets

U.S. PATENT DOCUMENTS

Figure 1B:
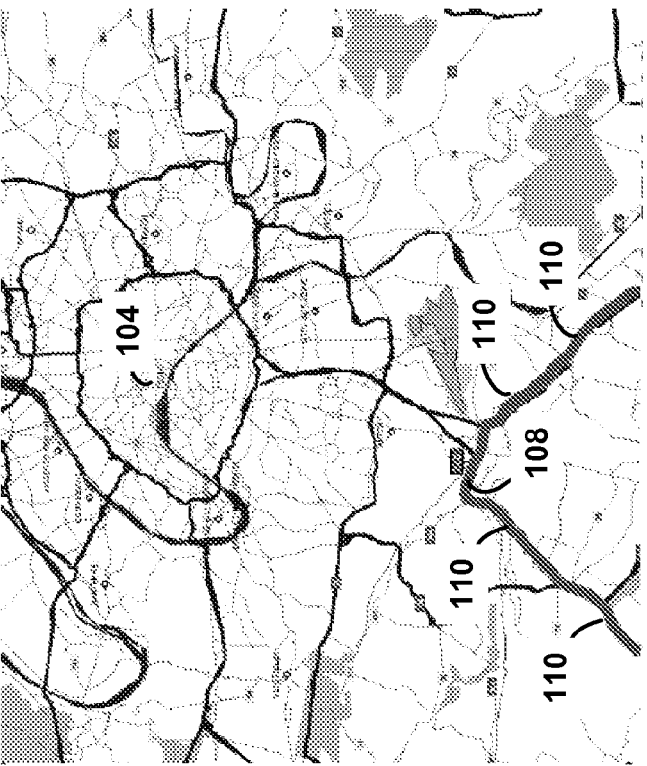

| | | |
|---|---|---|
| 6,189,130 B1 | 2/2001 | Gofman et al. |
| 6,201,540 B1 | 3/2001 | Gallup et al. |
| 6,204,778 B1 | 3/2001 | Bergan et al. |
| 6,205,397 B1 | 3/2001 | Eslambolchi et al. |
| 6,212,474 B1 | 4/2001 | Fowler et al. |
| 6,223,118 B1 | 4/2001 | Kobayashi et al. |
| 6,229,546 B1 | 5/2001 | Lancaster et al. |
| 6,249,740 B1 | 6/2001 | Ito et al. |
| 6,253,151 B1 | 6/2001 | Ohler et al. |
| 6,256,029 B1 | 7/2001 | Millington |
| 6,278,942 B1 | 8/2001 | McDonough |
| 6,308,134 B1 | 10/2001 | Croyle et al. |
| 6,320,517 B1 | 11/2001 | Yano et al. |
| 6,321,158 B1 * | 11/2001 | DeLorme et al. ............. 701/201 |
| 6,349,257 B1 | 2/2002 | Liu et al. |
| 6,356,210 B1 | 3/2002 | Ellis |
| 6,360,167 B1 | 3/2002 | Millington et al. |
| 6,362,751 B1 | 3/2002 | Upparapalli |
| 6,363,322 B1 | 3/2002 | Millington |
| 6,370,475 B1 | 4/2002 | Breed et al. |
| 6,377,278 B1 | 4/2002 | Cutright et al. |
| 6,381,536 B1 | 4/2002 | Satoh et al. |
| 6,385,535 B2 | 5/2002 | Ohishi et al. |
| 6,385,542 B1 | 5/2002 | Millington |
| 6,397,145 B1 | 5/2002 | Millington |
| 6,405,130 B1 | 6/2002 | Piwowarski |
| 6,408,243 B1 | 6/2002 | Yofu |
| 6,427,115 B1 | 7/2002 | Sekiyama |
| 6,430,501 B1 | 8/2002 | Slominski |
| 6,453,235 B1 | 9/2002 | Endo et al. |
| 6,484,089 B1 | 11/2002 | Millington |
| 6,487,494 B2 | 11/2002 | Odinak et al. |
| 6,515,595 B1 | 2/2003 | Obradovich et al. |
| 6,529,822 B1 | 3/2003 | Millington et al. |
| 6,529,824 B1 | 3/2003 | Obradovich et al. |
| 6,539,301 B1 | 3/2003 | Shirk |
| 6,542,814 B2 | 4/2003 | Polidi et al. |
| 6,565,610 B1 | 5/2003 | Wang et al. |
| 6,567,743 B1 * | 5/2003 | Mueller et al. ................. 701/209 |
| 6,574,551 B1 | 6/2003 | Maxwell et al. |
| 6,609,062 B2 | 8/2003 | Hancock |
| 6,631,322 B1 | 10/2003 | Arthur et al. |
| 6,671,617 B2 | 12/2003 | Odinak et al. |
| 6,704,649 B2 | 3/2004 | Miyahara |
| 6,728,608 B2 | 4/2004 | Ollis et al. |
| 6,728,636 B2 | 4/2004 | Kokijima et al. |
| 6,748,323 B2 | 6/2004 | Lokshin et al. |
| 6,765,554 B2 | 7/2004 | Millington |
| 6,774,932 B1 | 8/2004 | Ewing |
| 6,782,319 B1 | 8/2004 | McDonough |
| 6,816,596 B1 | 11/2004 | Peinado et al. |
| 6,819,301 B2 | 11/2004 | Nagamatsu et al. |
| 6,842,695 B1 | 1/2005 | Tu |
| 6,873,907 B1 | 3/2005 | Millington et al. |
| 6,885,874 B2 | 4/2005 | Grube et al. |
| 6,917,982 B1 | 7/2005 | Dueck et al. |
| 6,938,028 B1 | 8/2005 | Ito |
| 7,031,834 B2 | 4/2006 | Ito et al. |
| 7,031,836 B2 | 4/2006 | Branch |
| 7,058,504 B2 | 6/2006 | McDonough et al. |
| 7,170,518 B1 | 1/2007 | Millington et al. |
| 7,233,860 B2 | 6/2007 | Lokshin et al. |
| 7,260,475 B2 | 8/2007 | Suzuki |
| 7,321,826 B2 | 1/2008 | Sheha et al. |
| 7,333,820 B2 | 2/2008 | Sheha et al. |
| 7,343,242 B2 | 3/2008 | Breitenberger et al. |
| 7,353,107 B2 | 4/2008 | Breitenberger et al. |
| 7,379,812 B2 | 5/2008 | Yoshioka et al. |
| 7,421,334 B2 | 9/2008 | Dahlgren |
| 7,512,487 B1 | 3/2009 | Golding et al. |
| 7,546,202 B2 | 6/2009 | Oh |
| 7,590,490 B2 | 9/2009 | Clark |
| 2002/0151315 A1 | 10/2002 | Hendrey |
| 2003/0036842 A1 | 2/2003 | Hancock |
| 2003/0036848 A1 | 2/2003 | Sheha et al. |
| 2003/0167120 A1 | 9/2003 | Kawasaki |
| 2003/0182052 A1 * | 9/2003 | DeLorme et al. ............. 701/201 |
| 2003/0191578 A1 | 10/2003 | Paulauskas et al. |
| 2005/0107948 A1 | 5/2005 | Catalinotto |
| 2006/0080031 A1 | 4/2006 | Cooper et al. |
| 2006/0089788 A1 | 4/2006 | Laverty |
| 2006/0106534 A1 | 5/2006 | Kawamata et al. |
| 2006/0212217 A1 | 9/2006 | Sheha et al. |
| 2006/0265422 A1 | 11/2006 | Ando et al. |
| 2007/0027628 A1 | 2/2007 | Geelen |
| 2007/0073480 A1 | 3/2007 | Singh |
| 2007/0088494 A1 | 4/2007 | Rothman et al. |
| 2007/0130153 A1 | 6/2007 | Nachman et al. |
| 2007/0204218 A1 | 8/2007 | Weber et al. |
| 2007/0213929 A1 | 9/2007 | Tanizaki et al. |
| 2007/0233384 A1 | 10/2007 | Lee |
| 2008/0076451 A1 | 3/2008 | Sheha et al. |
| 2008/0134088 A1 | 6/2008 | Tse et al. |
| 2008/0177470 A1 | 7/2008 | Sutardja |
| 2008/0275646 A1 * | 11/2008 | Perng et al. ................... 701/210 |
| 2009/0138190 A1 | 5/2009 | Kulik |
| 2009/0150064 A1 | 6/2009 | Geelen |
| 2009/0171584 A1 | 7/2009 | Liu |
| 2009/0182498 A1 | 7/2009 | Seymour |
| 2009/0182500 A1 | 7/2009 | Dicke |
| 2009/0187340 A1 | 7/2009 | Vavrus |
| 2009/0187341 A1 | 7/2009 | Vavrus |
| 2009/0187342 A1 | 7/2009 | Vavrus |

FOREIGN PATENT DOCUMENTS

| | | |
|---|---|---|
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |
| WO | 2008070226 | 6/2008 |
| WO | 2008073717 | 6/2008 |
| WO | 2008100656 | 8/2008 |
| WO | 2008112335 | 9/2008 |
| WO | 2008130722 | 10/2008 |
| WO | 2008134093 | 11/2008 |
| WO | 2009036052 | 3/2009 |

OTHER PUBLICATIONS

International Patent Application No. PCT/US2009/030177, Written Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.

Transaction History of related U.S. Appl. No. 08/713,627, filed Sep. 13, 1996, entitled "Navigation System With User Definable Cost Values," now U.S. Patent No. 5,878,368.

Transaction History of related U.S. Appl. No. 08/762,012, filed Dec. 11, 1996, entitled "Navigation System With Forward Looking Origin Selection for Route Re-Calculation," now U.S. Patent No. 6,405,130.

Transaction History of related U.S. Appl. No. 09/037,772, filed Mar. 10, 1998, entitled "Navigation System Character Input Device," now U.S. Patent No. 6,037,942.

Transaction History of related U.S. Appl. No. 09/056,218, filed Apr. 7, 1998, entitled "Navigation System using Position Network for Map Matching," now U.S. Patent No. 6,108,603.

Transaction History of related U.S. Appl. No. 09/062,518, filed Apr. 17, 1998, entitled "3-Dimensional Intersection Display for Vehicle Navigation System," now U.S. Patent No. 6,611,753.
Transaction History of related U.S. Appl. No. 09/096,103, filed Jun. 11, 1998, entitled "Navigation System With a Route Exclusion List System," now U.S. Patent No. 6,362,751.
Transaction History of related U.S. Appl. No. 09/099,963, filed Jun. 19, 1998, entitled "Autoscaling of Recommended Route," now U.S. Patent No. 6,574,551.
Transaction History of related U.S. Appl. No. 09/100,683, filed Jun. 19, 1998, entitled "Navigation System Map Panning Directional Indicator," now U.S. Patent No. 6,175,801.
Transaction History of related U.S. Appl. No. 09/114,670, filed Jul. 13, 1998, entitled "Navigation System Vehicle Location Display," now U.S. Patent No. 6,049,755.
Transaction History of related U.S. Appl. No. 09/118,030, filed Jul. 17, 1998, entitled "Navigation System With Predetermined Indication of Next Maneuver," now U.S. Patent No. 6,078,684.
Transaction History of related U.S. Appl. No. 09/160,068, filed Sep. 24, 1998, entitled "Navigation System With Anti-Alias Map Display," now U.S. Patent No. 6,163,269.
Transaction History of related U.S. Appl. No. 09/176,630, filed Oct. 22, 1998, entitled "Street Identification for a Map Zoom of a Navigation System," now U.S. Patent No. 6,178,380.
Transaction History of related U.S. Appl. No. 09/239,692, filed Jan. 29, 1999, entitled "Vehicle Navigation System With Location Based Multi-Media Annotation," now U.S. Patent No. 6,360,167.
Transaction History of related U.S. Appl. No. 09/418,749, filed Oct. 15, 1999, entitled "Navigation System With Road Condition Sampling," now U.S. Patent No. 6,484,089.
Transaction History of related U.S. Appl. No. 09/435,381, filed Nov. 5, 1999, entitled "Navigation System Character Input Device," now U.S. Patent No. 6,765,554.
Transaction History of related U.S. Appl. No. 09/470,438, filed Dec. 22, 1999, entitled "Navigation System With All Character Support," now U.S. Patent No. 6,256,029.
Transaction History of related U.S. Appl. No. 09/470,441, filed Dec. 22, 1999, entitled "Navigation System With Unique Audio Tones for Maneuver Notification," now U.S. Patent No. 6,363,322.
Transaction History of related U.S. Appl. No. 09/487,654, filed Jan. 19, 2000, entitled "Navigation System With Route Indicators," now U.S. Patent No. 6,430,501.
Transaction History of related U.S. Appl. No. 09/519,143, filed Mar. 6, 2000, entitled "Navigation System With Complex Maneuver Instruction," now U.S. Patent No. 6,397,145.
Transaction History of related U.S. Appl. No. 09/535,733, filed Mar. 27, 2000, entitled "Selective Rendering of Cartographic Entities for Navigation System," now U.S. Patent No. 7,170,518.
Transaction History of related U.S. Appl. No. 09/547,004, filed Apr. 11, 2000, entitled "Navigation System With Zoomed Maneuver Instruction," now U.S. Patent No. 6,529,822.
Transaction History of related U.S. Appl. No. 09/661,982, filed Sep. 18, 2000, entitled "Points of Interest for Navigation System," now U.S. Patent No. 6,374,180.
Transaction History of related U.S. Appl. No. 09/679,671, filed Oct. 5, 2000, entitled "Navigation System With Run-Time Training Instruction," now abandoned.
Transaction History of related U.S. Appl. No. 09/691,531, filed Oct. 18, 2000, entitled "Multiple Configurations for a Vehicle Navigation System," now U.S. Patent No. 6,385,542.
Transaction History of related U.S. Appl. No. 09/799,876, filed Mar. 6, 2001, entitled "Navigation System With Figure of Merit Determination," now U.S. Patent No. 6,741,928.
Transaction History of related U.S. Appl. No. 10/088,017, filed Sep. 9, 2002, entitled "Navigation System With User Interface," now U.S. Patent No. 6,873,907.
Transaction History of related U.S. Appl. No. 10/208,261, filed Jul. 31, 2002, entitled "Displaying Data," now U.S. Patent No. 6,748,323.
Transaction History of related U.S. Appl. No. 10/619,619, filed Jul. 16, 2003, entitled "Intelligent Modular Navigation Information Capability," now U.S. Patent No. 7,233,860.
Transaction History of related U.S. Appl. No. 11/327,450, filed Jan. 9, 2006, entitled "Smart Detour."
Transaction History of related U.S. Appl. No. 11/518,205, filed Sep. 11, 2006, entitled "Method and System of Securing Content and Destination of Digital Download Via the Internet."
Transaction History of related U.S. Appl. No. 11/675,817, filed Feb. 16, 2007, entitled "A Method of Generating Curved Baseline for Map Labeling."
Transaction History of related U.S. Appl. No. 11/684,301, filed Mar. 9, 2007, entitled "Method and Apparatus for Determining a Route Having an Estimated Minimum Fuel Usage for a Vehicle."
Transaction History of related U.S. Appl. No. 11/737,125, filed Apr. 18, 2007, entitled "Method and System Navigation Using GPS Velocity Vector ."
Transaction History of related U.S. Appl. No. 11/740,280, filed Apr. 25, 2007, entitled "Adjusting Spatial Operations Based on Map Density."
Transaction History of related U.S. Appl. No. 11/840,610, filed Aug. 17, 2007, entitled "Methods and Apparatus for Measuring the Effectiveness of Advertisements Presented on a Mobile Navigation Device."
Transaction History of related U.S. Appl. No. 11/844,321, filed Aug. 23, 2007, entitled "Rerouting in Vehicle Navigation Systems."
Transaction History of related U.S. Appl. No. 11/852,973, filed Sep. 10, 2007, entitled "Nearest Neighbor Geographic Search."
Transaction History of related U.S. Appl. No. 11/906,277, filed Oct. 1, 2007, entitled "Static and Dynamic Contours."
Transaction History of related U.S. Appl. No. 11/945,211, filed Nov. 26, 2007, entitled "System and Method of Providing Traffic Data to a Mobile Device."
Transaction History of related U.S. Appl. No. 11/967,889, filed Dec. 31, 2007, entitled "System and Method for Accessing a Navigation System."
Transaction History of related U.S. Appl. No. 12/016,949, filed Jan. 18, 2008, entitled "Method and Apparatus for Hybrid Routing Using Breadcrumb Paths."
Transaction History of related U.S. Appl. No. 12/016,980, filed Jan. 18, 2008, entitled "Method and Apparatus to Search for Local Parking."
International Patent Application Serial No. PCT/US2009/030176, Written Opinion and International Search Report, mailed Sep. 1, 2009.
USPTO Tranaction History of related U.S. Appl. No. 08/691,663, filed Aug. 2, 1996, entitled "Method Providing a Textual Description of a Remote Vehicle Location," now U.S. Patent No. 6,141,621.
USPTO Transaction History of related U.S. Appl. No. 08/691,727, filed Aug. 2, 1996, entitled "System and Method for Controlling a Vehicle Emergency Response Network," now U.S. Patent No. 6,539,301.
USPTO Transaction History of related U.S. Appl. No. 08/710,473, filed Sep. 18, 1996, entitled "Navigation Simulator and Recorder," now U.S. Patent No. 5,922,041.
USPTO Transaction History of relatedd U.S. Appl. No. 08/713,625, filed Sep. 13, 1996, entitled "Navigation System With Vehicle Service Information," now U.S. Patent No. 5,819,201.
USPTO Transaction History of related U.S. Appl. No. 08/713,627, filed Sep. 13, 1996, entitled "Navigation System With User Definable Cost Values," now U.S. Patent No. 5,878,368.
USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.
USPTO Transaction History of related U.S. Appl. No. 09/037,772, filed Mar. 10, 1998, entitled "Navigation System Character Input Device," now U.S. Patent No. 6,037,942.
USPTO Transaction History of related U.S. Appl. No. 09/056,218, filed Apr. 7, 1998, entitled "Navigation System using Position Network for Map Matching," now U.S. Patent No. 6,108,603.
USPTO Transaction History of related U.S. Appl. No. 09/062,518, filed Apr. 17, 1998, entitled "3-Dimensional Intersection Display for Vehicle Navigation System," now U.S. Patent No. 6,611,753.
USPTO Transaction History of related U.S. Appl. No. 09/096,103, filed Jun. 11, 1998, entitled "Navigation System With a Route Exclusion List System," now U.S. Patent No. 6,362,751.

USPTO Transaction History of related U.S. Appl. No. 09/099,963, filed Jun. 19, 1998, entitled "Autoscaling of Recommended Route," now U.S. Patent No. 6,574,551.
USPTO Transaction History of related U.S. Appl. No. 09/100,683, filed Jun. 19, 1998, entitled "Navigation System Map Panning Directional Indicator," now U.S. Patent No. 6,175,801.
USPTO Transaction History of related U.S. Appl. No. 09/114,670, filed Jul. 13, 1998, entitled "Navigation System Vehicle Location Display," now U.S. Patent No. 6,049,755.
USPTO Transaction History of related U.S. Appl. No. 09/118,030, filed Jul. 17, 1998, entitled "Navigation System With Predetermined Indication of Next Maneuver," now U.S. Patent No. 6,078,684.
USPTO Transaction History of related U.S. Appl. No. 09/160,068, filed Sep. 24, 1998, entitled "Navigation System With Anti-Alias Map Display," now U.S. Patent No. 6,163,269.
USPTO Transaction History of related U.S. Appl. No. 09/176,630, filed Oct. 22, 1998, entitled "Street Identification for a Map Zoom of a Navigation System," now U.S. Patent No. 6,178,380.
USPTO Transaction History of related U.S. Appl. No. 09/239,692, filed Jan. 29, 1999, entitled "Vehicle Navigation System With Location Based Multi-Media Annotation," now U.S. Patent No. 6,360,167.
USPTO Transaction History of related U.S. Appl. No. 09/418,749, filed Oct. 15, 1999, entitled "Navigation System With Road Condition Sampling," now U.S. Patent No. 6,484,089.
USPTO Transaction History of related U.S. Appl. No. 09/435,381, filed Nov. 5, 1999, entitled "Navigation System Character Input Device," now U.S. Patent No. 6,765,554.
USPTO Transaction History of related U.S. Appl. No. 09/470,438, filed Dec. 22, 1999, entitled "Navigation System With All Character Support," now U.S. Patent No. 6,256,029.
USPTO Transaction History of related U.S. Appl. No. 09/470,441, filed Dec. 22, 1999, entitled "Navigation System With Unique Audio Tones for Maneuver Notification," now U.S. Patent No. 6,363,322.
USPTO Transaction History of related U.S. Appl. No. 09/487,654, filed Jan. 19, 2000, entitled "Navigation System With Route Indicators," now U.S. Patent No. 6,430,501.
USPTO Transaction History of related U.S. Appl. No. 09/519,143, filed Mar. 6, 2000, entitled "Navigation System With Complex Maneuver Instruction," now U.S. Patent No. 6,397,145.
USPTO Transaction History of related U.S. Appl. No. 09/535,733, filed Mar. 27, 2000, entitled "Selective Rendering of Cartographic Entities for Navigation System," now U.S. Patent No. 7,170,518.
USPTO Transaction History of related U.S. Appl. No. 09/547,004, filed Apr. 11, 2000, entitled "Navigation System With Zoomed Maneuver Instruction," now U.S. Patent No. 6,529,822.
USPTO Transaction History of related U.S. Appl. No. 09/661,982, filed Sep. 18, 2000, entitled "Points of Interest for Navigation System," now U.S. Patent No. 6,374,180.
USPTO Transaction History of related U.S. Appl. No. 09/679,671, filed Oct. 5, 2000, entitled "Navigation System With Run-Time Training Instruction," now abandoned.
USPTO Transaction History of related U.S. Appl. No. 09/691,531, filed Oct. 18, 2000, entitled "Multiple Configurations for a Vehicle Navigation System," now U.S. Patent No. 6,385,542.
USPTO Transaction History of related U.S. Appl. No. 09/799,876, filed Mar. 6, 2001, entitled "Navigation System With Figure of Merit Determination," now U.S. Patent No. 6,741,928.
USPTO Transaction History of related U.S. Appl. No. 10/088,017, filed Sep. 9, 2002, entitled "Navigation System With User Interface," now U.S. Patent No. 6,873,907.
USPTO Transaction History of related U.S. Appl. No. 10/208,261, filed Jul. 31, 2002, entitled "Displaying Data," now U.S. Patent No. 6,748,323.
USPTO Transaction History of related U.S. Appl. No. 10/619,619, filed Jul. 16, 2003, entitled "Intelligent Modular Navigation Information Capability," now U.S. Patent No. 7,233,860.
USPTO Transaction History of related U.S. Appl. No. 11/327,450, filed Jan. 9, 2006, entitled "Smart Detour."
USPTO Transaction History of related U.S. Appl. No. 11/518,205, filed Sep. 11, 2006, entitled "Method and System of Securing Content and Destination of Digital Download Via the Internet."
USPTO Transaction History of related U.S. Appl. No. 11/675,817, filed Feb. 16, 2007, entitled "A Method of Generating Curved Baseline for Map Labeling."
USPTO Transaction History of related U.S. Appl. No. 11/684,301, filed Mar. 9, 2007, entitled "Method and Apparatus for Determining a Route Having an Estimated Minimum Fuel Usage for a Vehicle."
USPTO Transaction History of related U.S. Appl. No. 11/737,125, filed Apr. 18, 2007, entitled "Method and System Navigation Using GPS Velocity Vector."
USPTO Transaction History of related U.S. Appl. No. 11/740,280, filed Apr. 25, 2007, entitled "Adjusting Spatial Operations Based on Map Density."
USPTO Transaction History of related U.S. Appl. No. 11/840,610, filed Aug. 17, 2007, entitled "Methods and Apparatus for Measuring the Effectiveness of Advertisements Presented on a Mobile Navigation Device."
USPTO Transaction History of related U.S. Appl. No. 11/844,321, filed Aug. 23, 2007, entitled "Rerouting in Vehicle Navigation Systems."
USPTO Transaction History of related U.S. Appl. No. 11/852,973, filed Sep. 10, 2007, entitled "Nearest Neighbor Geographic Search."
USPTO Transaction History of related U.S. Appl. No. 11/906,277, filed Oct. 1, 2007, entitled "Static and Dynamic Contours."
USPTO Transaction History of related U.S. Appl. No. 11/945,211, filed Nov. 26, 2007, entitled "System and Method of Providing Traffic Data to a Mobile Device."
USPTO Transaction History of related U.S. Appl. No. 11/967,889, filed Jan. 1, 2008, entitled "System and Method for Accessing a Navigation System."
USPTO Transaction History of related U.S. Appl. No. 12/013,384, filed Jan. 11, 2008, entitled "System and Method to Provide Navigational Assistance Using an Online Social Network."
USPTO Transaction History of related U.S. Appl. No. 12/016,949, filed Jan. 18, 2008, entitled "Method and Apparatus for Hybrid Routing Using Breadcrumb Paths."
USPTO Transaction History of related U.S. Appl. No. 12/016,980, filed Jan. 18, 2008, entitled "Method and Apparatus to Search for Local Parking."
USPTO Transaction History of related U.S. Appl. No. 12/016,982, filed Jan. 18, 2008, entitled "Method and Apparatus for Access Point Recording Using a Position Device."
USPTO Transaction History of related U.S. Appl. No. 12/188,139, filed Aug. 7, 2008, entitled "System and Method to Record a Present Trip."
Transaction History of related U.S. Appl. No. 12/016,982, filed Jan. 18, 2008, entitled "Method and Apparatus for Access Point Recording Using a Position Device."
Transaction History of related U.S. Appl. No. 12/188,139, filed Aug. 7, 2008, entitled "System and Method to Record a Present Trip."
Transaction History of related U.S. Appl. No. 12/013,384, filed Jan. 11, 2008, entitled "Systems and Method to Provide Navigational Assistance Using an Online Social Network."
Transaction History of related U.S. Appl. No. 12/195,152, filed Aug. 20, 2008, entitled "Systems and Methods for Smart City Search."
USPTO Transaction History of related U.S. Appl. No. 12/195,152, filed Aug. 20, 2008, entitled "Systems and Methods for Smart City Search."

* cited by examiner

802

$$SpeedCoeff = 40 \times \frac{SpeedCat - 1}{5} + 60 \times \frac{4 - Rank}{\max(4 - Layer, 2)}$$

FIGURE 8

902

| Speed Category | Kilometers Per Hour | Miles Per Hour |
| --- | --- | --- |
| 1 | Over 130 | Over 80 |
| 2 | 101 - 130 | 65 - 80 |
| 3 | 91 - 100 | 55 - 64 |
| 4 | 71- 90 | 41 - 54 |
| 5 | 51 - 70 | 31 - 40 |
| 6 | 31 - 50 | 21 - 30 |
| 7 | 11 - 30 | 6 - 20 |
| 8 | Under 11 | Under 6 |
| 9 | ~ 3.4 | ~ 2 |

FIGURE 9

$$1012 \begin{cases} Angle1 = S\hat{O}P_1 \\ Angle2 = P_1\hat{O}D \\ Angle3 = Angle1 + Angle2 = S\hat{O}D \end{cases}$$

$$1010 \begin{cases} Head_{SP} = \overrightarrow{SP_1} \cdot Heading \\ Head_{PD} = \overrightarrow{P_1D} \cdot Heading \\ Head_{Seg} = \overrightarrow{P_1P_2} \cdot Heading \end{cases}$$

$$1008 \quad Coeff1 = \left(1 - \frac{Angle1}{Angle3}\right) \times 100$$

$$1006 \quad Coeff2 = \left(1 - \frac{Angle2}{Angle3}\right) \times 100$$

$$1004 \quad WHead = \frac{Coeff1 \times Head_{SP} + 2 \times Coeff2 \times Head_{PD}}{Coeff1 + 2 \times Coeff2}$$

$$1002 \quad AngleCoeff = \left(\frac{WHead - Head_{Seg}}{80}\right)^2 \times 100$$

FIGURE 10

$$SpeedCoeff_{P1P2} = \frac{SpeedCoeff_{Prop} \times L_{Prop} + SpeedCoeff_{P1P2} \times L_{P1P2}}{L_{Prop} + L_{P1P2}}$$

$$AngleCoeff_{P1P2} = \frac{AngleCoeff_{Prop} \times L_{Prop} + AngleCoeff_{P1P2} \times L_{P1P2}}{L_{Prop} + L_{P1P2}}$$

$$FinalCoeff_{P1P2} = SpeedCoeff_{P1P2} + AngleCoeff_{P1P2}$$

FIGURE 11

Layer 0
- TypicalRadius=600; //Typical radius of town
- MinNetworkDensity=0; //minimum density to accept the layer
- MaxNetworkDensity=200; //maximum density to accept the layer
- MinSearchDensity=50; //minimum density in squares along star branches
- MaxSearchDensity=600; //maximum density in squares along star branches
- SearchDepth=10; //Depth of trees
- DistanceToDest=300; //min distance between tree and destination (stop construction of tree)

Layer 1
- TypicalRadius=1800; //Typical radius of town
- MinNetworkDensity=2; //minimum density to accept the layer
- MaxNetworkDensity=45; //maximum density to accept the layer
- MinSearchDensity=12; //minimum density in squares along star branches
- MaxSearchDensity=200; //maximum density in squares along star branches
- SearchDepth=10; //Depth of trees
- DistanceToDest=700; //min distance between tree and destination (stop construction of tree)

Layer 2
- TypicalRadius=4000; //Typical radius of town
- MinNetworkDensity=2; //minimum density to accept the layer
- MaxNetworkDensity=10; //maximum density to accept the layer
- MinSearchDensity=1.2; //minimum density in squares along star branches
- MaxSearchDensity=80; //maximum density in squares along star branches
- SearchDepth=10; //Depth of trees
- DistanceToDest=1000; //min distance between tree and destination (stop construction of tree)

Layer 3
- TypicalRadius=10000; //Typical radius of town
- MinNetworkDensity=1; //minimum density to accept the layer
- MaxNetworkDensity=3; //maximum density to accept the layer
- MinSearchDensity=0.3; //minimum density in squares along star branches
- MaxSearchDensity=30; //maximum density in squares along star branches
- SearchDepth=10; //Depth of trees
- DistanceToDest=1000; //min distance between tree and destination (stop construction of tree)

Layer 4
- TypicalRadius=15000; //Typical radius of town
- MinNetworkDensity=0; //minimum density to accept the layer
- MaxNetworkDensity=1; //maximum density to accept the layer
- MinSearchDensity=0.1; //minimum density in squares along star branches
- MaxSearchDensity=65; //maximum density in squares along star branches
- SearchDepth=10; //Depth of trees
- DistanceToDest=10000; //min distance between tree and destination (stop construction of tree)

FIGURE 12

Layer 0
- TypicalRadius=600; //Typical radius of town
- MinNetworkDensity=0; //minimum density to accept the layer
- MaxNetworkDensity=350; //maximum density to accept the layer
- MinSearchDensity=50; //minimum density in squares along star branches
- MaxSearchDensity=600; //maximum density in squares along star branches
- SearchDepth=10; //Depth of trees
- DistanceToDest=300; //min distance between tree and destination (stop construction of tree)

Layer 1
- TypicalRadius=1800; //Typical radius of town
- MinNetworkDensity=2; //minimum density to accept the layer
- MaxNetworkDensity=55; //maximum density to accept the layer
- MinSearchDensity=10; //minimum density in squares along star branches
- MaxSearchDensity=100; //maximum density in squares along star branches
- SearchDepth=10; //Depth of trees
- DistanceToDest=700; //min distance between tree and destination (stop construction of tree)

Layer 2
- TypicalRadius=4000; //Typical radius of town
- MinNetworkDensity=3; //minimum density to accept the layer
- MaxNetworkDensity=30; //maximum density to accept the layer
- MinSearchDensity=3; //minimum density in squares along star branches
- MaxSearchDensity=80; //maximum density in squares along star branches
- SearchDepth=10; //Depth of trees
- DistanceToDest=1000; //min distance between tree and destination (stop construction of tree)

Layer 3
- TypicalRadius=7000; //Typical radius of town
- MinNetworkDensity=3; //minimum density to accept the layer
- MaxNetworkDensity=7; //maximum density to accept the layer
- MinSearchDensity=1; //minimum density in squares along star branches
- MaxSearchDensity=70; //maximum density in squares along star branches
- SearchDepth=10; //Depth of trees
- DistanceToDest=1000; //min distance between tree and destination (stop construction of tree)

Layer 4
- TypicalRadius=10000; //Typical radius of town
- MinNetworkDensity=0; //minimum density to accept the layer
- MaxNetworkDensity=2; //maximum density to accept the layer
- MinSearchDensity=0.4; //minimum density in squares along star branches
- MaxSearchDensity=65; //maximum density in squares along star branches
- SearchDepth=10; //Depth of trees
- DistanceToDest=10000; //min distance between tree and destination (stop construction of tree)

FIGURE 13

ROUTE NAVIGATION VIA A PROXIMITY POINT

FIELD OF THE INVENTION

The present disclosure pertains to calculating a route that passes by an identified location, e.g., a large city, and more particularly to a system and method by which a navigational route from one point to another is determined, the determined routing passing by the identified location.

BACKGROUND

An application, navigation or other route-generation, application, can generate a route with directions from one location to another. The route is typically generated based on an origination point and a destination point. To generate a route, the application requires at least one origination point and a destination point. The application uses the origination and destination point input to generate a route that identifies the roads to be taken to travel from the origination to the destination point. In a case that the user specifies multiple destinations, the application generates a route from the origin to the first destination and then from the first destination to another destination and so on until the final destination. Thus, existing applications determine a route from one point, an origination point, to another point, a destination point.

SUMMARY

It would be beneficial to be able to use one or more additional points to further define the route between origination and destination points. The present disclosure addresses this and further seeks to address failings in the art. In accordance with embodiments disclosed, a system and method is provided that uses one or more points, e.g., "smart via" input points, to determine one or more points, e.g., smart via output points, that can be used, together with at least one origination point and destination point, to identify a navigational route between the origination and destination points. In accordance with one or more embodiments, the navigational route is determined to be an optimal, or best, route. In accordance with one or more embodiments, a navigational route is generated using the smart via output point as a destination along the route, which travels in proximity to the smart via input point. In accordance with one or more embodiments, a smart via output point is located in proximity to, and is different from, the smart via input point. In addition and in accordance with one or more such embodiments, a smart via input point is used to determine a route between origination and destination points, such that the smart via input point is used to identify a smart via output point, which is used as a point along the determined route from the origination point to the destination point.

By virtue of one or more embodiments of the invention, a smart via input point can be used in route generation as a further refinement of the route, e.g., a smart via output identified using a smart via input point acts as another point, in addition to the origination and destination points, for use in generating a route. For example, a user may wish to travel from Nantes to Marseille via a route that passes by, but does not go through, Paris. In this example, Paris can be used as a smart via input point along with the origin and destination points of Nantes and Marseille to generate a smart via output point, which comprises a point corresponding to a segment of a roadway outside of Paris. In accordance with one or more embodiments, the smart via output point is calculated so that it is positioned on an optimal level of road for the size of the city the user wishes to pass by, e.g., a smart via output point that is positioned on a freeway or motorway for a large city such as Paris or New York, that is positioned on a highway for a "mid-sized" city, and that is positioned on a secondary road for "small" city. In accordance with one or more embodiments, the size of the city is determined based on a road density calculated for the city. The smart via output point can then be input, together with the origin and destination points, to generate a route from Nantes to Marseille via the smart via output point, e.g., the point located outside of Paris calculated using the smart via input point.

Figure 1A:
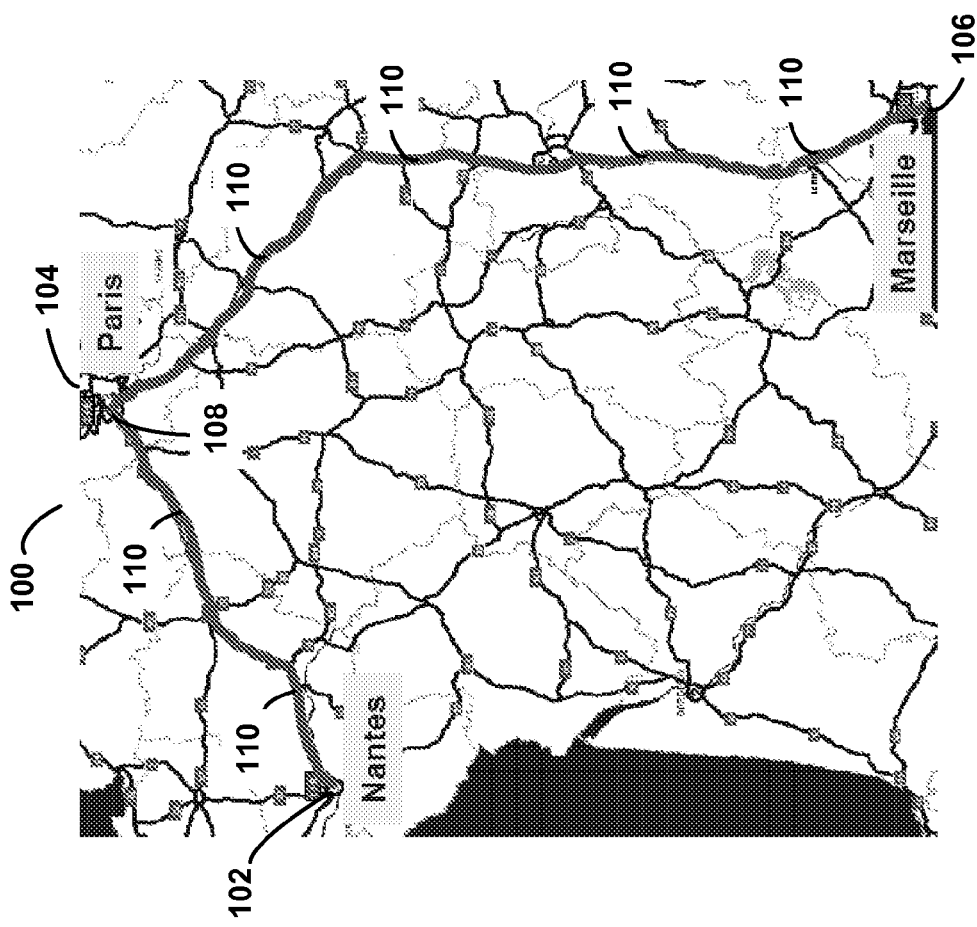

FIG. 1, which comprises Figures in 1A and 1B, illustrates a route that includes a smart via output point generating using Paris as a smart via input point delete in accordance with one or more embodiments of the present disclosure. Referring to FIG. 1A, map 100 includes the cities of Nantes, which is identified by reference number 102, Paris, which is identify by reference number 104, and Marseille which is identified by reference number 106, and a number of roads between the cities. A typical route generated where Nantes is the origination point, Paris is a destination point and Marseille is the final destination point would comprise a route from Nantes through Paris and then delete from Paris to Marseille. In accordance with one or more embodiments of the present disclosure, Paris 104 is used as a smart via input point to generate a smart via output point 108. The smart via output point 108 is used, rather than the city of Paris, as a point along the route from the origin, Nantes 102, to the final destination, Marseille 106. Route 110 comprises a route generated using the smart via output point 108 identified outside of Paris 104. FIG. 1B provides a map 120, which provides a magnified view and shows route 110 outside of Paris 104 that includes the smart via output point 108 generated in accordance with one or more embodiments of the present disclosure. In the example shown in FIG. 1B, the smart via output point 108 is located at a position on a freeway south of the city of Paris.

By way of yet another non-limiting example, embodiments of the present disclosure can be used to preselect the route in a case that there are multiple routes between the origination and destination points. For example, there are at least two routes between Los Angeles, Calif., the origination point, and New York, N.Y., the destination point. A southern route takes highway 40 through Arizona, New Mexico, etc. A northern route uses highways 15 and 70 through Utah, Colorado, etc. Using Denver, Colo. as the smart via input point, a smart via output point can be generated and can then used with the origination point, Los Angeles, Calif., and the destination point, New York, N.Y., to identify the northern route via highways 15 and 70 between Los Angeles and New York City. Selecting Albuquerque, N.Mex. as the smart via input point can result in a smart via output point being selected such that the southern route via Highway 40 is used between Los Angeles and New York City.

A navigational route is generated using an origination point corresponding to a starting point for the navigational route, a destination point corresponding to a destination point for the route, a smart via output point that is identified to be an optimal point and that is in proximity to, and is different from, a smart via input point, the smart via output point being determined from the origination, destination and smart via input points. In accordance with one or more embodiments, a system is provided that comprises one or more processors configured to provide the functionality. In accordance with another embodiment, functionality is embodied in steps of a method performed by at least one computing device, or processors. In accordance one or more embodiments, program code to implement the functionality is embodied on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1, which comprises Figures in 1A and 1B, illustrates a route that includes a smart via output point generating using Paris as a smart via input point delete in accordance with one or more embodiments of the present disclosure.

Figure 2:
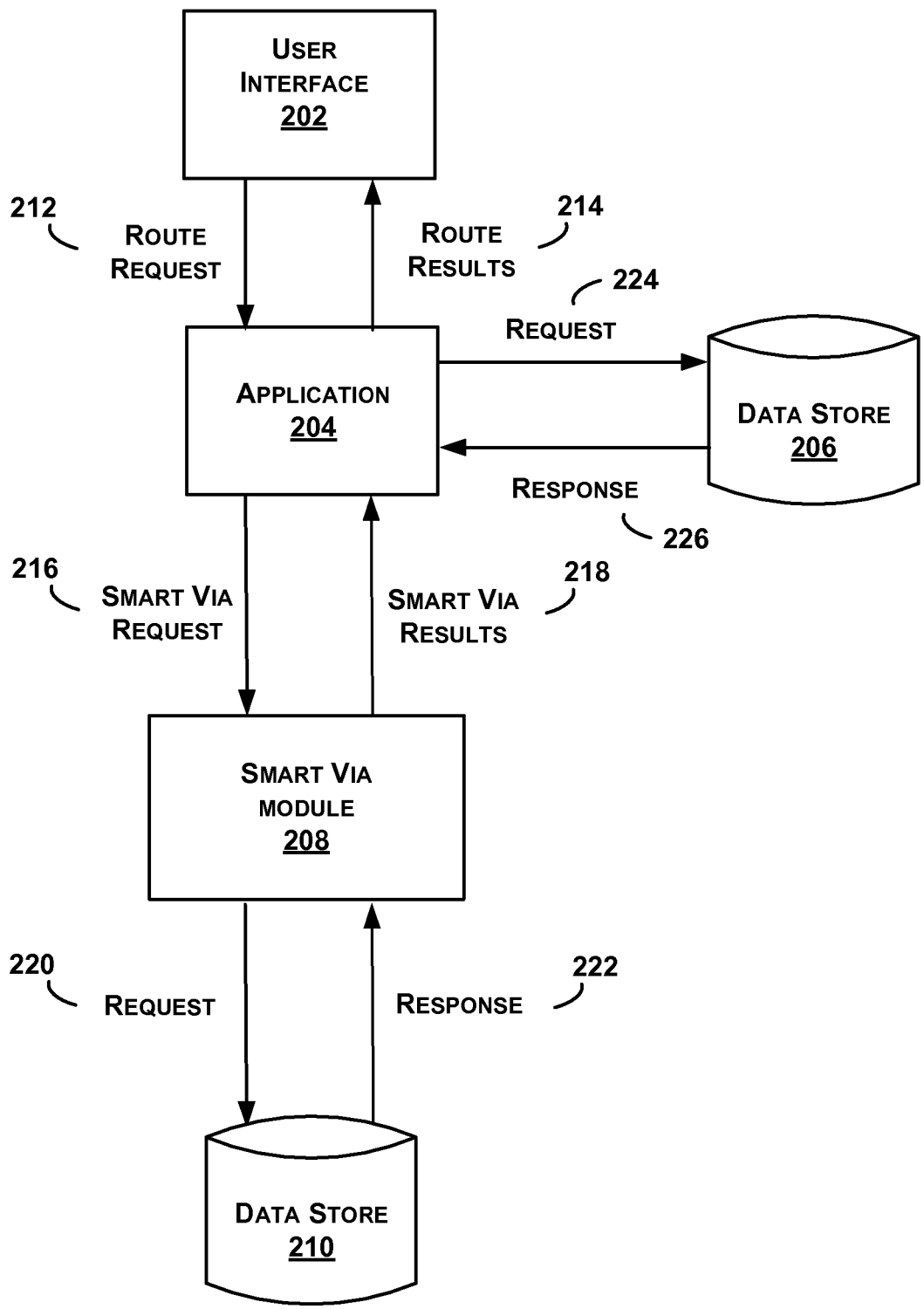

FIG. 2 provides an exemplary block diagram illustrating components of a system for use in accordance with one or more embodiments of the present disclosure.

Figure 3:
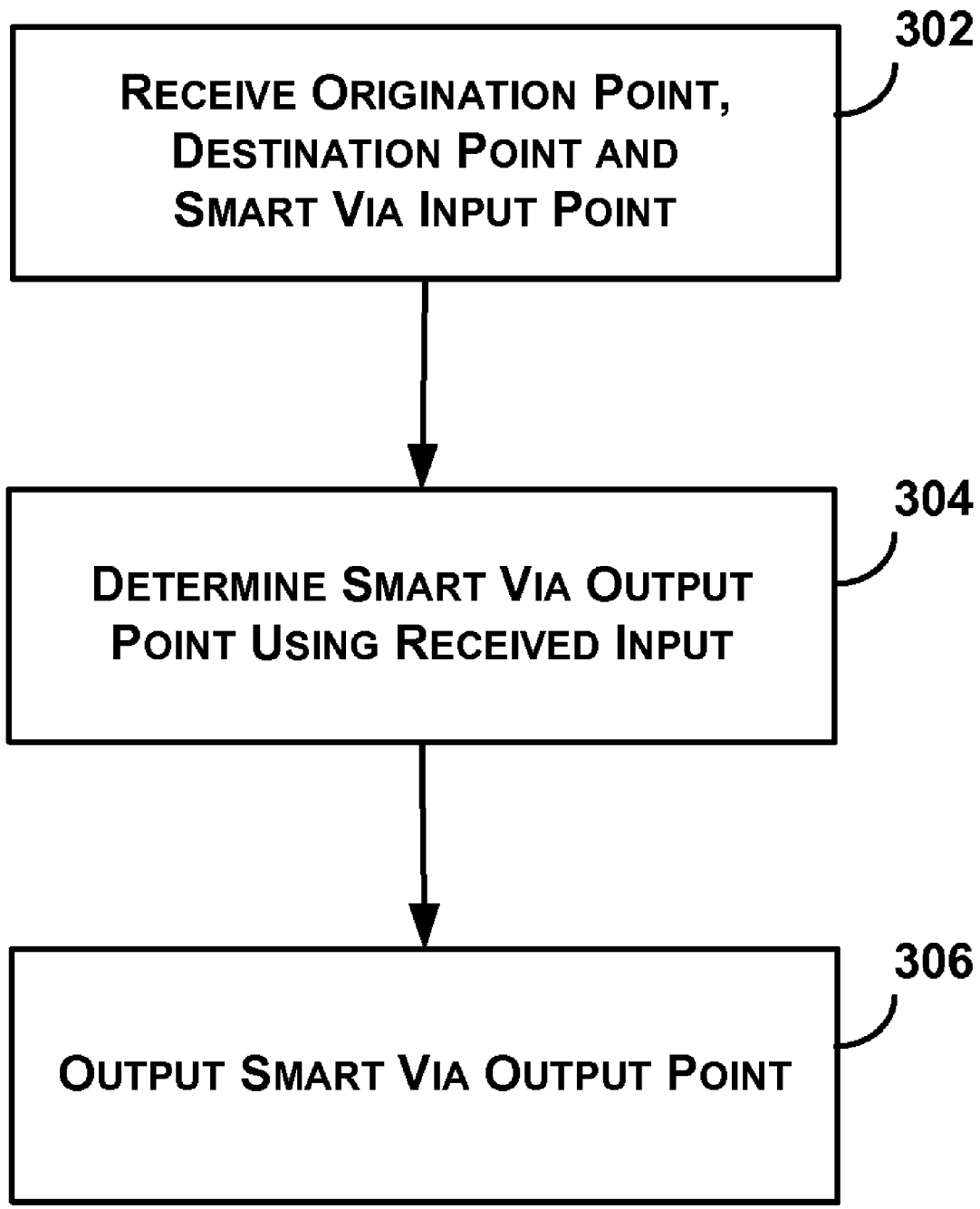

FIG. 3 provides an example of a smart via output point generation process flow in accordance with one or more embodiments of the present disclosure.

Figure 4A:
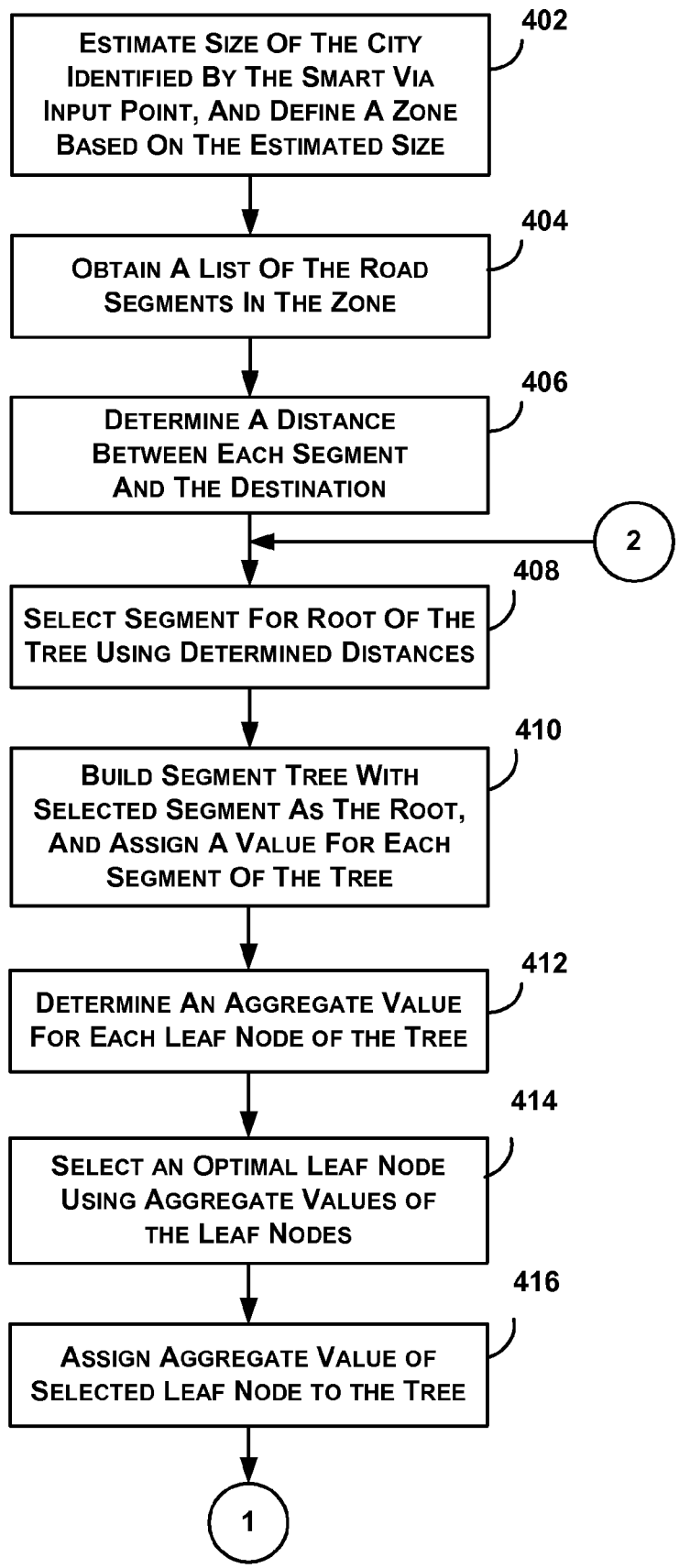
Figure 4B:
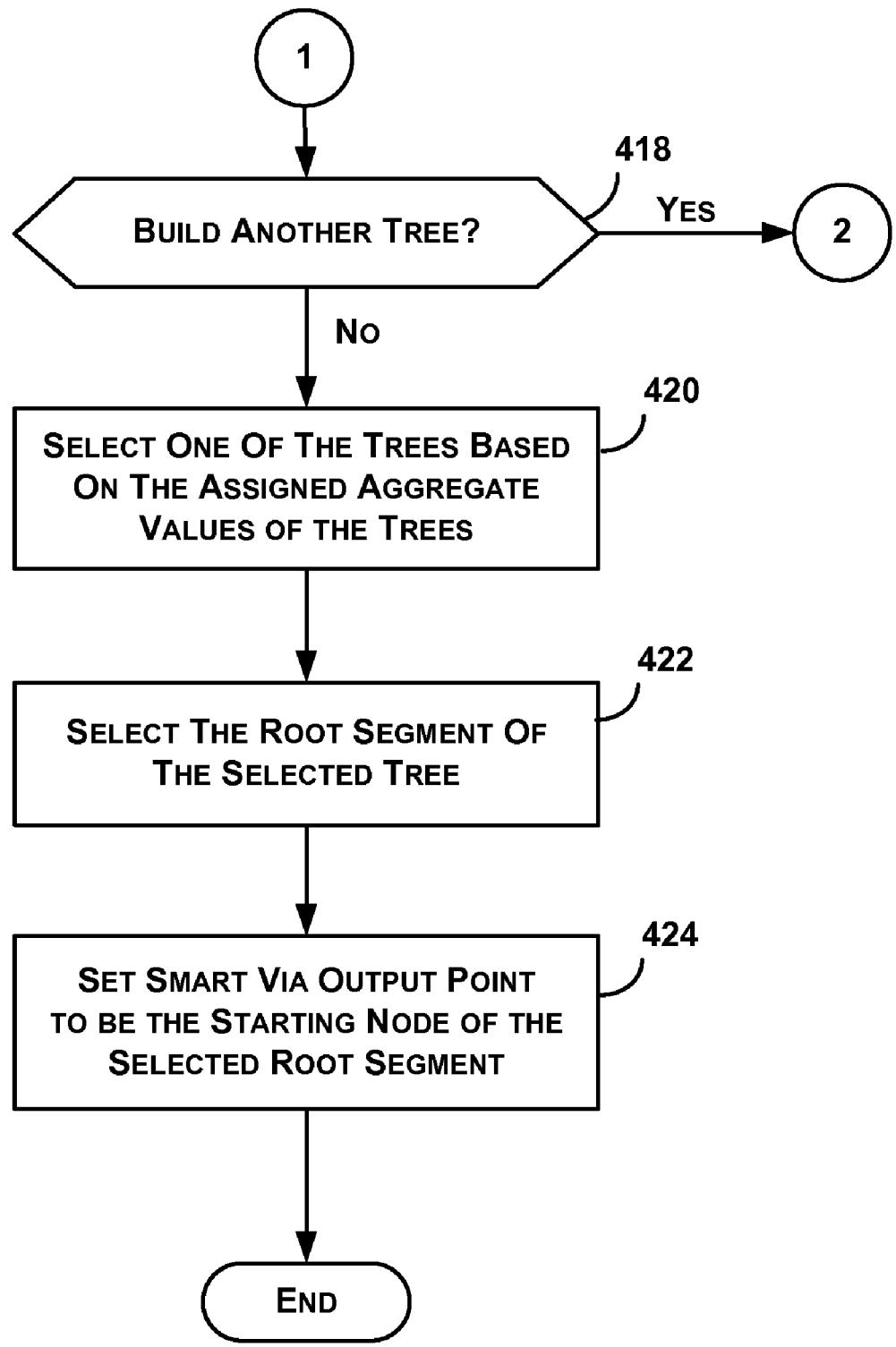

FIG. 4, which comprises FIGS. 4A and 4B, provides an example of a smart via output point determination process flow for use in accordance with one or more embodiments of the present disclosure.

Figure 5A:
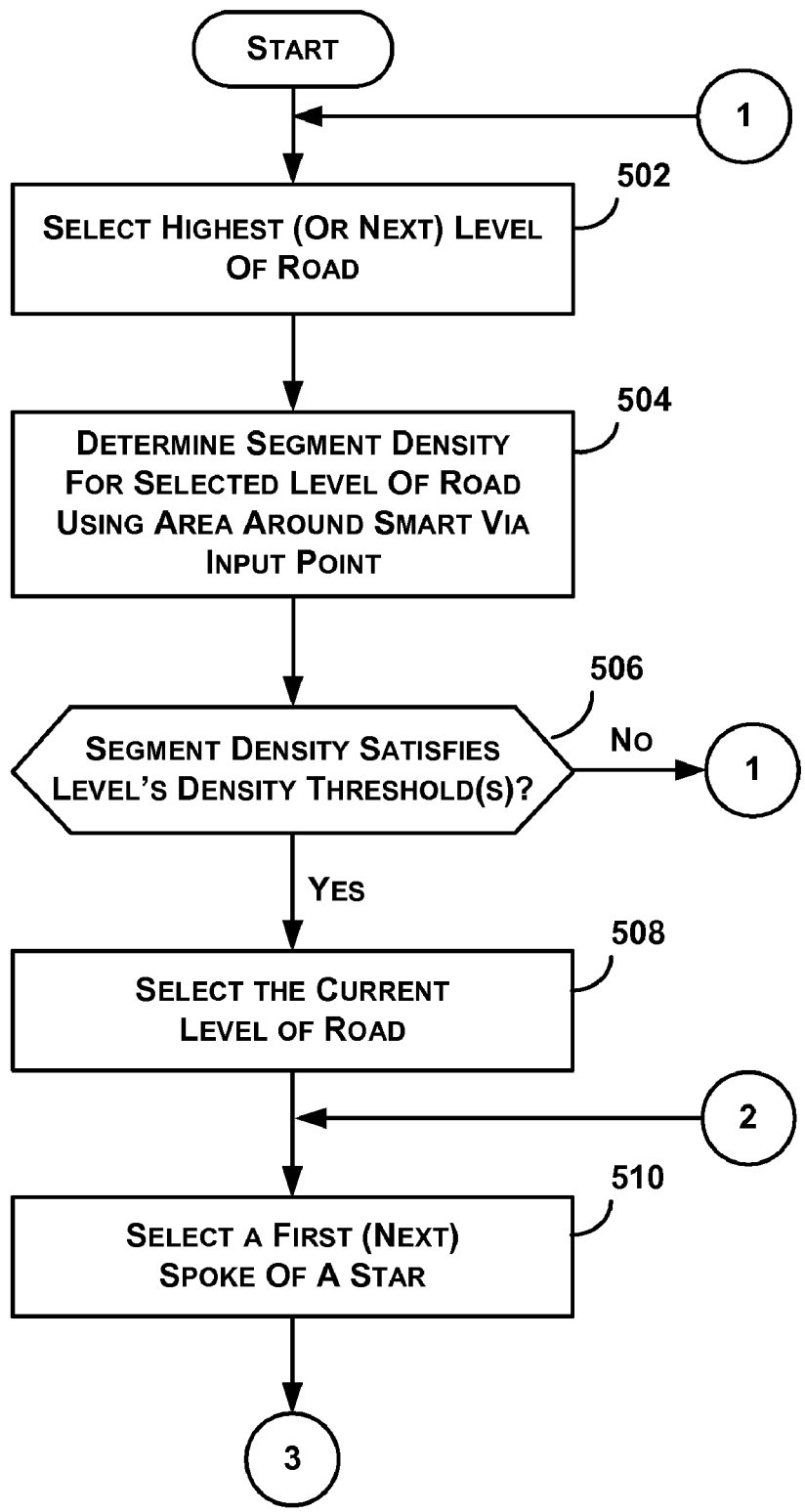
Figure 5B:
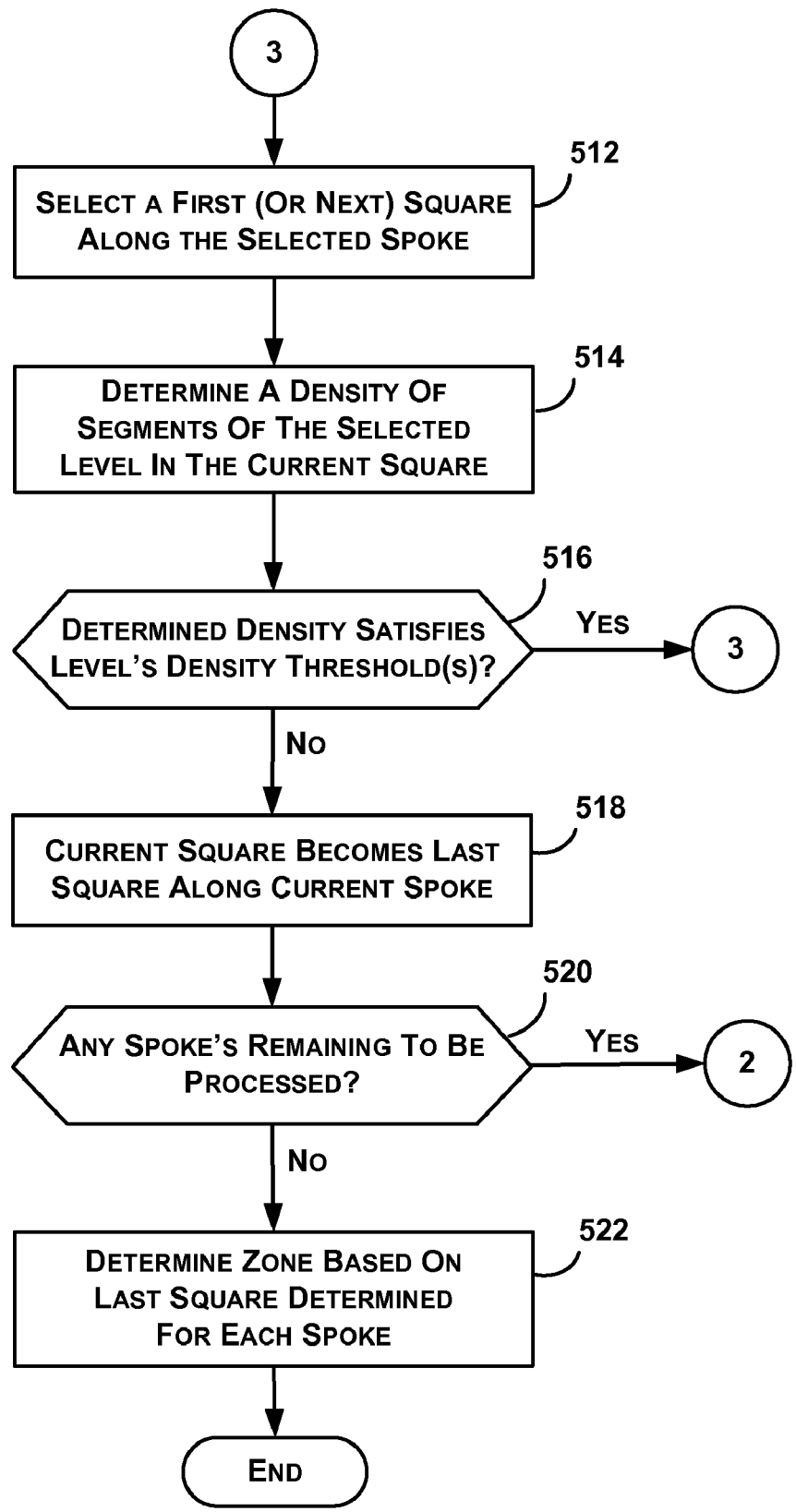

FIG. 5, which comprises FIGS. 5A and 5B, provides an example of a size estimation process flow in accordance with one or more embodiments of the present disclosure.

Figure 6:
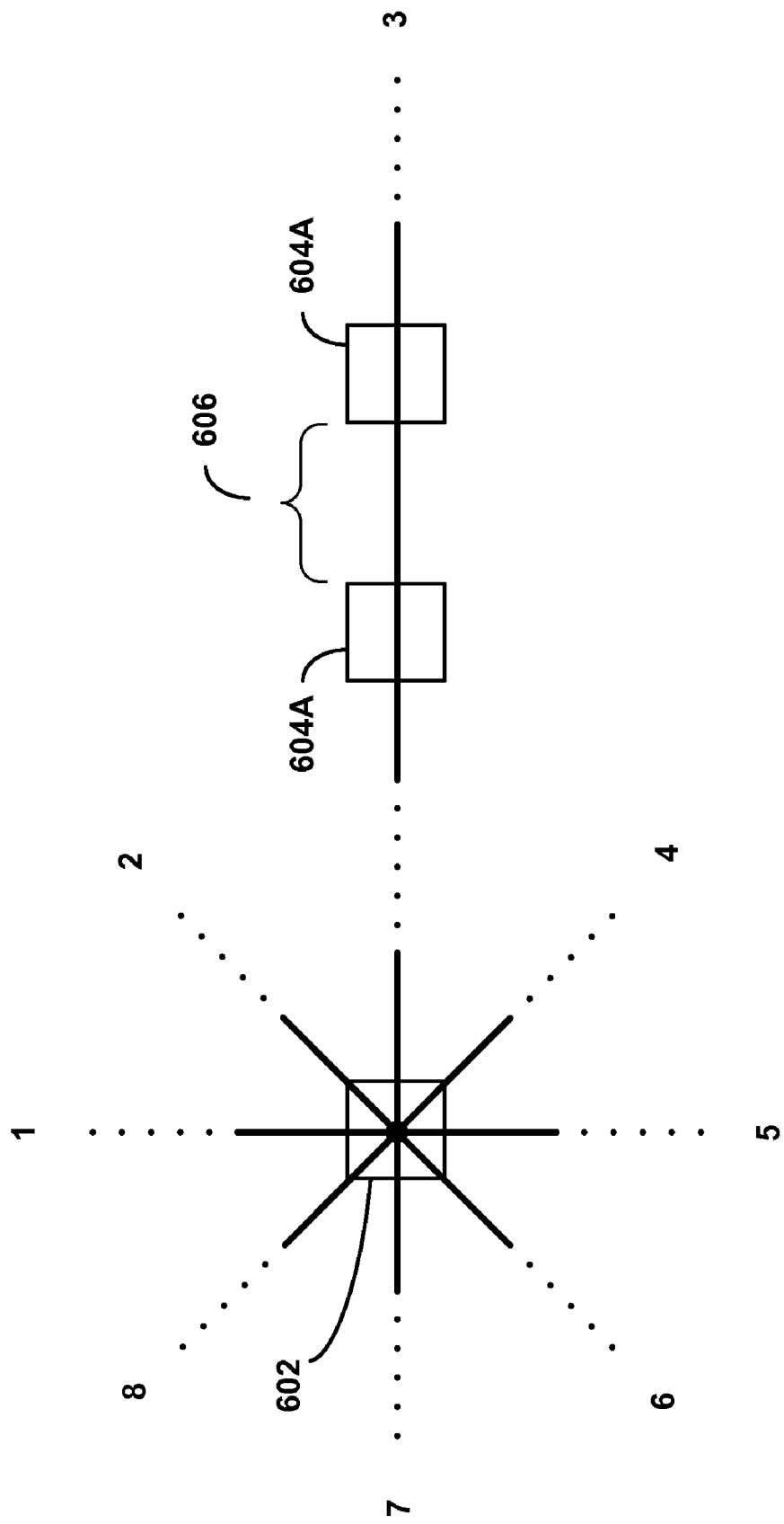

FIG. 6 provides an example of an eight-spoke star that can be used in determining a zone size in accordance with one or more embodiments of the present disclosure.

Figure 7:
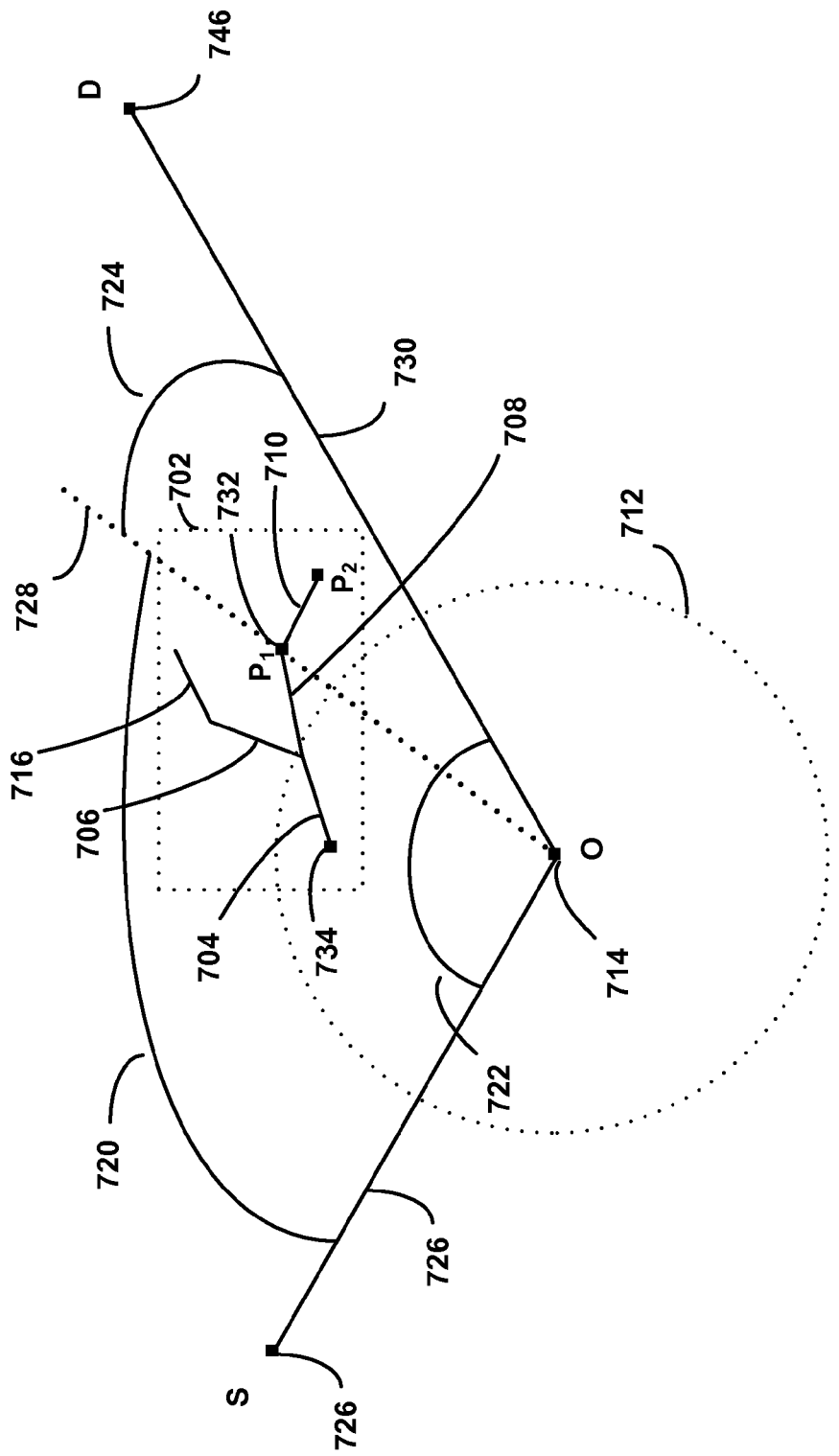

FIG. 7 provides an example using at least one cell from a previous row to identify cells in a subsequent row as part of a current ring in accordance with one or more embodiments of the present disclosure.

FIG. 8 provides an example of an equation for use in calculating a speed coefficient for a segment of a segment tree in accordance with one or more embodiments of the present disclosure.

FIG. 9 provides an example of any speed category table, which includes examples of speed categories and associated speed limit ranges, for use in accordance with one or more embodiments of the present disclosure.

FIG. 10 provides examples of equations for use in determining an angle coefficient for a segment of a segment tree in accordance with one or more embodiments of the present disclosure.

FIG. 11 provides examples of equations for use in determining a final coefficient for a leaf node segment in a segment tree in accordance with one or more embodiments of the present disclosure.

FIGS. 12 and 13 provide examples of sets of layer thresholds for use in accordance with one or more embodiments of the present disclosure.

DETAILED DESCRIPTION

In general, the present disclosure includes a route navigation via a proximity point, and a system, method and architecture thereof.

Certain embodiments of the present disclosure will now be discussed with reference to the aforementioned figures, wherein like reference numerals refer to like components.

FIG. 2 provides an exemplary block diagram illustrating components of a system for use in accordance with one or more embodiments of the present disclosure. In accordance with one or more such embodiments, a user interface 202 can be used to specify a smart via input point. The user interface 202 can include, for example, a map display and/or one or more menus to identify the smart via input point. The user submits a route request 212 to application 204, and receives route results 214 in response. In accordance with one or more embodiments, route results 214 can be displayed on a map displayed by a computing device for the user based on information provided by application 204. User interface 202 can be generated by application 204. Application 204 can be, for example, a route generation application, such as a Global Positioning System (GPS) navigation system. Application 204 can be coupled to data store 206, which can include data used by the application 204, e.g., geographic location data, etc. By way of a non-limiting example, application 204 can request data from data store 206 via a request 224, and receive data from data store 206 via a response 226.

User interface 202 can supply input that identifies a smart via input point, e.g., input provided by a user using a pointing mechanism to select a point on a map displayed by a computing device for the user. The input can also include a request to generate a route from origination and destination points, which can also be specified by the user. Application 204 outputs a smart via request 216 to smart via module 208 to generate a smart via output point using the smart via input point, together with the origination and destination points. Smart via module 208 can be integral to application 204, or an external module. Application 204 can communicate with smart via module 208 using an application programming interface (API), for example. Smart via module 208 generates a smart via output point using the input provided by application 204 via smart via request 216. In addition, smart via module 208 can use data from data store 210, e.g., requesting data via request 220 and receiving data via response 222. As is described in more detail below, data store 210 can comprise data for roads and/or segments of roads. In accordance with one or more embodiments of the disclosure, application data store 206 and data store 210 can be a combined data store. In accordance with one or more such embodiments, information extracted by smart via module 208 comprises information used to identify a smart via output point, and information extracted by application 204 comprises information used to determine a navigation route.

In response to smart via request 216, smart via module 208 determines a smart via output point, which is then forwarded to application 204 via smart via results 218. Application 204 can then use smart via output point, together with the origination and destination points, to determine a route that includes the smart via output point, and runs "close by" the smart via input point. In accordance with one or more embodiments, the distance between the smart via input point and smart via output point can vary based on segments of roads that are located in a zone that encompasses the smart via input point.

In accordance with one or more embodiments of the present disclosure, a computer-readable medium can store program code embodying the functionality of smart via module 208. Alternatively, in accordance with one or more embodiments of the present disclosure, one or more computing devices and/or processors can be configured using the program code to provide the functionality of smart via module 208. Smart via methods and systems are provided in accordance with one or more embodiments of the present disclosure.

FIG. 3 provides an example of a smart via output point generation process flow in accordance with one or more embodiments of the present disclosure. In accordance with at least one embodiment, process flow is performed by smart via module 208. At step 302, smart via module 208 receives an origination point, destination point and smart via input point. Smart via module 208 determines a smart via output point using the received input at step 304. The smart via output point is output by smart via module 208 at step 306.

FIG. 4 provides an example of a process flow for use in determining a smart via output point in accordance with one or more embodiments of the present disclosure. The process flow example can implement step 304 of FIG. 3. Generally, in accordance with one or more embodiments, a smart via input point corresponds to a center of a city, and a smart via output point corresponding to the smart via input point is determined by determining a size of the city, a zone that encompasses the city, and a layer. The layer is used to identify the segment level, or ranking, that is to be used in identifying segments to build one or more segment trees. A number of trees are built using segments of one or more roads. Segments that fall within the determined zone around the smart via input point and that have a ranking, or level, that satisfies the layer are examined to identify a root node for each of the one or more segment trees built. For each tree built, one or more segments in addition to the root segment are selected and a node is added to the segment tree for each of the one or more additional segments selected for the tree. For each tree built, a value is assigned to each segment of the tree, an aggregate value is determined for each leaf node of the segment tree, a leaf node is selected based on the aggregate values of the leaf nodes of the tree, and a value is assigned to the segment tree that comprises the aggregate value of the selected leaf node. One of the segment trees is selected based on a comparison of the aggregate values assigned to the segment trees. The root of the selected segment tree is used to identify the smart via point.

In the example shown in FIG. 4, the smart via input point corresponds to a city center. It should be apparent, however, that the smart via input point can be any geographic point. In one or more embodiments, the smart via input point, origination point, destination point, and smart via output point are expressed using geographic location information, e.g., latitude and longitude values.

Referring to step 402 of FIG. 4A, the size of the city identified by the smart via input point is estimated, and a zone that encompasses the smart via input point is to find based on the estimated size. FIG. 5, which comprises FIGS. 5A and 5B, provides an example of a size estimation process flow in accordance with one or more embodiments of the present disclosure. Generally, the size of the city is estimated based on segment densities, e.g., the number of segments of road, determined for each of one or more road levels, or ranks, corresponding to a geographic area associated with the city. In accordance with one or more embodiments, the geographic area is defined by a geometric shape, such as a square, which encompasses the smart via input point, e.g., the center of the city. The estimated size of the city, and/or a determined layer, is used to determine a zone that surrounds the smart via input point. In accordance with one or more embodiments, the size of the square used to determine the size of the city remains constant for each road level, or rank, examined and segment density determined for each level of road examined. In accordance with one or more embodiments, a road is comprised of one or more segments, each of which has the same level or ranking as the road. Unless otherwise indicated, the terms level and rank are used interchangeably herein.

Referring to FIG. 5A, at step 502 a first level of road, e.g., the highest level of road, is selected. By way of a non-limiting example, a level of road can be used to categorize roads such that roads that have similar characteristics fall within the same category. Examples of characteristics include, but are not limited to, a speed limit, divided highway, type of surface, ingress/egress, stop signs/lights, number of lanes, etc. By way of a further non-limiting example, a motorway, freeway, expressway, turnpike etc. fall within a category identified as the "highest" level of road, because these roads typically have the fastest speed limit, are divided roads, have limited (if any) stoplights/signs, limited (if any) cross traffic, efficient ingress/egress (e.g., merging traffic), the greatest number of lanes, etc. An example of a "lesser" level of road category might be an urban street that has a lower speed limit, may or may not be divided, typically has some stoplights/signs, etc.

In a case that the highest level of road corresponds to motorways, freeways, etc., the segments in the first level of road selected at step 502 of FIG. 5A are segments of a motorway, freeway, etc. At step 504, a segment density is determined for the selected level of road. In accordance with one or more embodiments, the segment is determined for a given geographical area, such as a geometric square, that surrounds the smart via input point. In accordance with one or more embodiments, the size of the square used to determine a city size and a level of road is constant regardless of the level of road being examined. The segment density identifies the number of segments that occur for the square, e.g., a segment that has at least a portion within the square, or alternatively is completely within the square. In a case that intersections are used to define segments of a road, it is likely that there are fewer segments per square for the higher levels of road then some of the lesser levels of road, since the higher levels of road, e.g., a freeway, typically do not have intersections. In accordance with one or more embodiments, the highest level of road that has a corresponding segment density that satisfies a segment density threshold corresponding to the level of road is selected.

At step 506, the segment density determined at step 504 is compared to at least one density threshold for the level to determine whether the segment density for the selected level of road satisfies the density threshold for the level of road. If not, processing continues at step 502 to select the next level of road, e.g., the next highest level of road. If the determined segment density satisfies the density threshold, processing continues at step 508 to select the current level of road to determine a zone size. As is discussed in more detail below, the selected level of road can be used to identify a corresponding rank threshold, which rank threshold is used, together with the rank information associated with the road segments, to determine whether or not a segment can be selected for a segment tree.

In accordance with one or more embodiments, the size of the zone is determined using segment densities determined for squares located along each spoke of an 8-spoke star. The size of the square used to determine the zone can be determined based on the selected level of road. The selected level of road can also be used to determine the distance between two squares along the spoke of the star. FIG. 6 provides an example of an eight-spoke star that can be used in determining a zone size in accordance with one or more embodiments of the present disclosure. Each spoke of the example star shown in FIG. 6 is labeled with a number, i.e., 1 to 8. It should be apparent that, while the spokes can be processed in an order indicated by the numbers, the spokes of the star can be processed in any order. In addition, it should be apparent that any number of spokes, or any other technique, can be used to determine the location of the squares used to determine the size of a zone. Square 602 represents the square used at step 504 to determine the segment density for the selected level of road. Squares 604A represent two squares along spoke 3 of the star. The size of square 604A and/or the distance 606 between two squares 604A can be determined based on the selected level of road.

Referring again to FIG. 5A, at step 510 first, or next, spoke of the star is selected, e.g., spoke 3 of FIG. 6. At step 512 of FIG. 5B, a first (or next) square is selected along the selected spoke. Assuming for the sake of example, that the leftmost square 604A along spoke 3 is selected square, a density of segments for the squares 604A is determined at step 514. In accordance with one or more embodiments, the segment density is determined based on the number of segments of a road that correspond to the level of road selected at step 508 of FIG. 5A. At step 516, a determination is made whether or not the density determined at step 514 satisfies a density threshold, e.g., a density threshold corresponding to the selected level of road. In accordance with one or more embodiments, the density threshold used in step 516 can be the same as the density threshold used for that level of road at step 506 of FIG. 5A. If the determined density satisfies the level's density threshold, processing continues at step 512 to process another square along the current spoke.

In accordance with one or more embodiments, the process continues until a square's determined density fails to satisfy the density threshold for the selected level of road. If it is determined at step 516 that the determined density does not satisfy the density threshold, processing continues at step 518 to mark the current square as the last square along the current spoke. At step 520, a determination is made whether or not any spokes of the star remain to be processed. If so, processing continues at step 510 of FIG. 5A. If all of the spokes of the star have been processed, processing continues at step 522 to determine the zone based on the last square marked for each spoke. By way of a non-limiting example, a zone is determined that uses the outermost edge of each square marked for each spoke.

Referring again to FIG. 4A, at step 404, a list of the road segments for the determined zone is obtained. In accordance with one or more embodiments, the segment list can include each road segment for which all or a portion of the segment lies within the identified zone, and which satisfies a layer corresponding to the level of road selected at step 508. By way of a non-limiting example, if the level of road selected at step 508 is level 2, the layer is set to 2 and segments that have a ranking of 2 or higher, e.g., segment rankings 2 to 4, can be used to build the list of segments at step 404. By way of a further non-limiting example, a selected level of 0 is used to define a layer equal to 0, and segments that have a ranking of 0 or higher, segment ranking from 0 to 4, can be used to build the segment list at step 404.

At step 406, a distance is determined for each segment. The distance being a distance between the segment and the destination point. Each segment has a start point, $P_1$, and an end point, $P_2$. An example of a segment, segment 710, is shown in FIG. 7. In accordance with at least one embodiment, the distance for a segment is determined by calculating the distance between the segment's end point, $P_2$, and the destination point, which destination point was received as input by smart via module 208. For the sake of an example and with reference to FIG. 7, the distance for segment 710 would be the distance between $P_2$ of segment 710 and destination point 746.

At step 408 of FIG. 4A, a segment is selected for the root of the first, or subsequent, tree using the determined distances, such that the segment selected is determined to be the closest segment, based on its determined distance to the destination point, which has not yet been selected as a root of a segment tree. Referring again to FIG. 7, if segment 704 of segment tree 702 is determined to be the segment, in zone 712, that is the closet to destination point 746, and segment 704 is not a root of another segment tree, segment 704 is selected as a root of a segment tree, e.g., segment tree 702. Zone 712 is determined for smart via input point 714 in a manner discussed herein, e.g., in connection with FIG. 5.

Referring again to FIG. 4A, at step 410, a segment tree is constructed with the selected segment, e.g., segment 704, as the root. Referring again to FIG. 7, tree 702 is constructed at step 410. In accordance with one or more embodiments of the present disclosure, a segment tree is built by iteratively identifying segment(s) connected to a segment of the tree in the direction of the destination point, e.g., destination point 746. In accordance with one or more such embodiments, construction of the segment tree can be terminated after a number of iterations, e.g., five iterations, with the depth of the tree corresponding to the number of iterations. In accordance with one or more embodiments, a threshold number of iterations can be used to determine a point to terminate construction of the tree. Alternatively, tree construction can be terminated once the depth of the tree satisfies a depth threshold, e.g., the depth of the tree can correspond to the number of segments in the longest traversal of the tree. As yet another non-limiting example, tree construction can be terminated once a threshold distance to the destination point is reached. In accordance with one or more embodiments, the threshold that is used can vary based on the selected level of road.

In addition and at step 410, a value is assigned for each segment of the tree. In accordance with one or more embodiments, a segment's value is determined using speed and angle coefficients determined for the segment. In addition to the coefficient value determined for a leaf node of a branch of the tree, at step 412, an aggregate coefficient value is assigned to the leaf node, which aggregate coefficient value is the aggregate of the coefficient values of each of the segments traversed from the root to reach the leaf node.

At step 414, an optimal leaf node of the segment tree is selected based on the aggregate values associated with the leaf nodes of the segment tree. By way of a non-limiting example, the aggregate values of one or more leaf nodes are compared, with an optimal one of the leaf nodes being the leaf node that has the least aggregate value of the aggregate values compared. It should be apparent that any of a number of other techniques can be used to identify an optimal leaf node. At step 416, a value is assigned to the segment tree using the aggregate value of the leaf node selected as an optimal one of the leaf nodes of the segment tree.

At step 418 of FIG. 4B, a determination is made whether or not to build another segment tree. The determination can be based on processing considerations, etc. By way of a non-limiting example, the determination can be made based on a determination that the distance to the destination point calculated for the remaining segments available to be used as the root of a new segment tree is greater than a predetermined threshold. By way of a further non-limiting example, the determination can be made based on the degree to which segments are being repeated in the segments previously processed.

In accordance with one or more embodiments, processing performed on subsequent trees can be optimized. For example and in a case that a segment is repeated in a subsequent tree, the angle and speed coefficients calculated for the segment in connection with a previous tree can be used for the segment in the subsequent-processed segment tree. In accordance with one or more embodiments, a segment is selected as a root of a segment tree based on its distance, e.g., closeness, to the destination point, e.g., one segment is selected over another segment if it is determined to be closer to the destination point than the other segment. Using this approach, there is some likelihood that a subsequently-processed segment tree will have at least one segment in common with a previously-processed segment tree. Since the angle and speed coefficients would be the same for a segment regardless of the tree in which it is used, the common segment's previously-calculated values can be used in the subsequently-processed segment tree.

If it is determined at step 418 that another segment tree is to be built, processing continues at step 408 to process another segment tree. If a determination is made, at step 418, not to build another tree processing continues at step 420 to select one of the segment trees based on the aggregate values assigned to the segment trees. By way of a non-limiting example, the aggregate values of one or more segment trees are compared, with an optimal segment tree being the segment tree that has the least aggregate value of the aggregate values compared. It should be apparent that any of a number of other techniques can be used to identify an optimal segment tree. At step 422, the root node of the segment tree identified as an optimal one of the segment trees is identified, and the starting node, $P_1$, of the road segment corresponding to the identified root node is used, at step 424, as the smart via output point, e.g., starting node 734 of the segment 704. The starting node of the road segment is identified to be an optimal point, and is output as the smart via output point at step 306 of FIG. 3 by smart via module 208, e.g., output to application 204 in smart via results 218 in response to the smart via request 216. Application 204 can then use the smart via output point as an intermediate destination point along a route further defined by the origination and destination points provided by the route requests 212.

In accordance with one or more embodiments, the A* algorithm can be used to facilitate construction of a segment tree. The A* algorithm can be used to select an "optimal" one segment at any level of the segment tree, a root segment and/or a segment that is attached to a segment of the tree. By way of a non-limiting example and in a case that segments "B", "C" and "D" are attached to segment "A", the A* algorithm can be used to choose an optimal segment, e.g., "D" from the identified segments, e.g., "B", "C" and "D". The A* algorithm can be used to select an optimal one of the identified segments, and therefore the identified segment need only be processed, e.g., there is no need to process the other ones of the segments that are attached to segment "A". Criteria for acceptance and/or rejection of a segment can be identified to use the A* algorithm, e.g., the criteria can be identified based on segment rank, coefficient value, etc.

As discussed above in connection with step 410 of FIG. 4A, each segment of a segment tree is assigned a value. In accordance with one or more embodiments, a segment's value comprises the sum of angle and speed coefficients determined for the segment. A segment's angle coefficient is determined in accordance with how the segment "comes from" the origination point and how the segment is "going to" the destination point. A segment's speed coefficient provides a "load criteria", e.g., a speed limit associated with the segment. In accordance with one or more embodiments, a goal is to have the smart via output point on a freeway, so that the user traveling the route generated using the smart via output point need not leave the freeway and/or can stay on a "high level road".

Referring to FIG. 7 and in accordance with one or more embodiments, a coefficient value, e.g., a sum of angle and speed coefficient values, is determined for each of the segments of tree 702. In addition to the coefficient value determined for segment 710, an aggregate coefficient value is determined for each leaf node segment, e.g., segment 710. In accordance with one or more embodiments, the aggregate coefficient value comprises an aggregate of the angle and speed coefficient values of segments 704, 708 and 710. In accordance with one or more such embodiments, a weighting is used in determining the aggregate value. An aggregate coefficient value can also be determined for, segment 716, as a leaf node, with the aggregate coefficient value being the aggregate of the coefficient values determined for segments 704, 706 and 716.

In accordance with one or more embodiments, the angle coefficient is determined using equation 1002 of FIG. 10. By way of a non-limiting example and in accordance with equation 1002, the angle coefficient determined for a segment, e.g., segment 710, is based on angles 1012, e.g., Angle1, Angle2 and Angle3. By way of a non-limiting example, Angle1, Angle2 and Angle3 correspond to angles 720, 724 and 722, respectively. Angle 722, e.g., angle SOD, is the angle formed by points 726, 714 and 746. Angle 722 can also be expressed as the sum of angles 720 and 724. Angle 720, e.g., $SOP_1$, is formed by points 726, 714 and 732, e.g., point $P_1$. Angle 724, e.g., $P_1OD$, is formed from points 732, e.g., point $P_1$, 714 and 746.

In addition to equation 1002, a segment's angle coefficient is determined using headings 1010, coefficients 1008 and 1006 and weighted heading 1004. Headings 1010 are determined for vectors $SP_1$, $P_1D$ and $P_1P_2$. By way of a non-limiting example, each vector's heading is determined based on the vector's orientation. By way of some further non-limiting examples, if vector $SP_1$ is oriented toward the east, $Head_{SP}$ is assigned a value of 90 degrees, and if $SP_1$ is oriented toward the west, the value of $Head_{SP}$ is 270 degrees. As yet further non-limiting examples, a direction due north has a heading of 0 degrees and a direction due south has a heading of 180 degrees. A normalized coefficient 1008 is determined using a ratio of Angle1 to Angle3, and a normalized coefficient 1006 is determined using a ratio of Angle2 to Angle3. Angle coefficient 1002 is determined using heading 1004 and heading 1010.

In accordance with one or more embodiments, speed coefficient is determined using equation 802. By way of a non-limiting example, the speed coefficient takes into account a segment's speed category, rank (e.g. an importance identified from zero to four) and a layer (e.g., a value from zero to four) at which the segment is treated. In accordance with one or more such embodiments, the layer corresponds to the level of road selected at step 508 of FIG. 5A. In addition, each segment has a corresponding speed category. Table 902 of FIG. 9 provides examples of speed categories and associated speed limit ranges corresponding to each speed category. For example and in a case that a speed limit associated with segment 710 is identified to be 50 kilometers per hour, its speed category would be 6. Speed category 9 corresponds to pedestrian segments, e.g., a speed value for a pedestrian segment is 3.4 kilometers per hour or 2 miles per hour.

As discussed above, a segment has a rank, which can be said to identify the importance of the segment. For example, a segment of a high level road, e.g., a motorway, has a rank of 4. As discussed above, an appropriate layer can be identified corresponding to the level of road selected at step 508 of FIG. 5A. An identified layer is used to determine what segment ranks, and segments, are to be considered in constructing and processing segment trees. For example, at layer zero, all levels of segments, e.g., all segments that have a rank zero or higher, are to be considered. At layer 1, segments having a rank, or level, of 1 to 4 are considered, at layer 2, segments having a rank, or level, of 2 to 4 are considered, etc. In other words, a layer can be used to identify the lowest level of road/segment that is to be considered.

In accordance with one or more embodiments, in estimating the size of a city typically corresponds to the level of road, and layer, determined at step 508. By way of some non-limiting examples, layer 4 is typically considered to correspond to a large-sized city, and layer 2 typically corresponds to a medium-sized city.

In the example and equation 802 shown in FIG. 8, the rank of the segment for which the speed coefficient is being calculated and the layer for the city, are used, together with a speed category for the current segment, to determine the segment's speed coefficient. In equation 802, a maximum of a subtraction result and the value 2 is used as a denominator, the subtraction result being determined by subtracting the identified layer from the value 4. The numerator for the fraction is determined by subtracting the determined rank from the value 4. The other fraction uses a speed category for the segment, which is based on unknown speed limit for the segment.

Referring to FIG. 11, a final coefficient can be determined for the leaf node segment using the equations shown. As discussed above, each segment in the segment tree has a speed coefficient, e.g., a speed coefficient calculated using equation 802, and an angle quotation, e.g., an angle coefficient calculated using equations 1002 to 1012. In traversing the segment tree, speed and angle coefficients for each segment in the traversal to generate an aggregate speed coefficient and an aggregate angle coefficient for the leaf node segment. The aggregated speed and angle coefficients are some to yield a final coefficient for the leaf node segment. In the example shown in FIG. 11, length weightings are used to determine the speed, angle and final coefficients. A propagated length weighting, $L_{Prop}$, comprises an accumulated length of the segments in a traversal from the root node segment to the segment just prior to the leaf node segment, e.g., the accumulated lengths of root node segment 704 and segment 708. The $L_{P1P2}$ weighting is the length of the leaf node segment, e.g., segment 710. The speed coefficient for the leaf node segment is the sum of the speed coefficients of the segments traversed to reach the leaf node segment, which sum is weighted using the propagated length weighting, $L_{Prop}$, and the product of the leaf node segment's speed coefficient and the leaf node segment's length weighting, $L_{P1P2}$. The angle coefficient for the leaf node segment is the sum of the angle coefficients of the segments traversed to reach the leaf node segment, which sum is weighted using the propagated weighting, $L_{Prop}$, and the product of the leaf node segment's angle coefficient and a weighting, $L_{P1P2}$.

In accordance with one or more embodiments, thresholds can be assigned for each layer, e.g., layers 0 to 4. In accordance with one or more such embodiments, different thresholds can be used for different geographic regions, e.g., one set of layer thresholds can be used in North America and another set of layer thresholds, different from those used in North America, can be used in Europe. FIGS. 12 and 13 provide examples of sets of layer thresholds for use in accordance with one or more embodiments of the present disclosure.

By way of a non-limiting example, the layer thresholds shown in FIG. 12 could be used in North America, while the layer thresholds shown in FIG. 13 might be used in Europe. By way of a further non-limiting example, thresholds that can be used for a given layer can include a typical radius that extends from a city center, which threshold can be used to compare with the zone determined for the city, minimum and maximum densities, which can be used as density thresholds at step 506 of FIG. 5A, minimum and maximum square densities, which can be used as square density thresholds at step 516 of FIG. 5B, and search depth and distance to destination thresholds, which can be used at step 416 of FIG. 4B to determine whether or not to build additional segment trees.

Embodiments of the present disclosure can be implemented within a general purpose microprocessor, or other processing device. If implemented in software, the techniques may be embodied as instructions, or program code, on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform, and/or to be configured to perform, functionality described in this disclosure.

By way of further non-limiting examples, one or more disclosed embodiments might be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computer-implemented method executed by a processor of a navigational system for generating a navigational route, said method comprising:

determining a smart via output point using origination, destination and smart via input points, the origination point corresponding to a starting point for a navigational route, the destination point corresponding to a destination point for the route, and the smart via output point being a point for the navigational route that is identified to be an optimal point and that is in proximity to, and different from, the smart via input point, wherein determining the smart via output point comprises:

estimating a size of a city corresponding to the smart via input point;

determining a zone surrounding the smart via input point according to the estimated size of the city corresponding to the smart via input point; and selecting a segment of a road within the zone as the smart via output point according to a level of the selected segment and the estimated size of the city; and generating the navigational route using the origination, destination and smart via output points.

2. The method of claim 1, wherein the segment of the road comprises a root of a segment tree identified using the original, destination and smart via input points.

3. The method of claim 1, said determining a smart via output point further comprising:

creating one or more segment trees comprising at least one node, each node corresponding to a segment of a road, each road segment having a starting and ending point;

estimating a value for each of the one or more segment trees;

selecting one of the one or more segment trees using the estimated at least one value; and using the starting point of the selected segment tree's root node as the smart via output point.

4. The method of claim 3, wherein the estimated value for a segment tree comprises an optimal aggregate value selected from one or more aggregate values determined for the segment tree, each aggregate value for the segment tree corresponding to a traversal path of nodes from the segment tree's root node to a leaf node of the segment tree and comprising a weighted sum of values assigned to each of the nodes of the traversal path.

5. The method of claim 4, the value assigned to a node being determined using speed and angle coefficients determined for the node.

6. The method of claim 3, said creating one or more segment trees further comprising:

determining a geographic area about the smart via input point;

identifying a plurality of segments using the determined geographic area;

for each of the one or more segment trees:

identifying one of the plurality of segments as a root node of the segment tree using a determined distance of the segment from the destination point; and identifying one or more nodes for the segment tree, each identified node corresponding to one of the plurality of segments having an aggregate direction to the destination point that satisfies an aggregate direction threshold.

7. The method of claim 6, wherein each segment of road has a ranking corresponding to a level of a road, said determining a geographic area about the smart via input point further comprising:

determining a segment density for at least one of a plurality of levels of road and an initial geographic area about the smart via input point, the determined segment density for a level of road corresponding to a number of segments associated with the initial geographic area and having a ranking corresponding to the road level;

selecting a highest one of the levels of roads for which the determined segment density satisfies a density threshold corresponding to the level of road; and determining a segment density for each of a plurality of zone-determination geographic areas about the smart via input point, the segment density for a zone-determination geographic area corresponding to the number of segments associated with the zone-determination geographic area and having a ranking corresponding to the selected level of road; and determining the geographic area about the smart via input point using the zone-determination geographic areas that have a determined segment density that satisfies a zone-determination density threshold.

8. A system for generating a navigational route, the system comprising:

one or more processors configured to:

determine a smart via output point using origination, destination and smart via input points, the origination point corresponding to a starting point for a navigational route, the destination point corresponding to a destination point for the route, and the smart via output point being a point for the navigational route that is identified to be an optimal point and that is in proximity to, and different from, the smart via input point, wherein determining the smart via output point comprises:

estimating a size of a city corresponding to the smart via input point;

determining a zone surrounding the smart via input point according to the estimated size of the city corresponding to the smart via input point; and selecting a segment of a road within the zone as the smart via output point according to a level of the selected segment and the estimated size of the city; and generate the navigational route using the origination, destination and smart via output points.

9. The system of claim 8, wherein the segment of the road comprises a root of a segment tree identified using the original, destination and smart via input points.

10. The system of claim 8, said one or more processors configured to determine a smart via output point being further configured to:

create one or more segment trees comprising at least one node, each node corresponding to a segment of a road, each road segment having a starting and ending point;

estimate a value for each of the one or more segment trees;

select one of the one or more segment trees using the estimated at least one value; and use the starting point of the selected segment tree's root node as the smart via output point.

11. The system of claim 10, wherein the estimated value for a segment tree comprises an optimal aggregate value selected from one or more aggregate values determined for the segment tree, each aggregate value for the segment tree corresponding to a traversal path of nodes from the segment tree's root node to a leaf node of the segment tree and comprising a weighted sum of values assigned to each of the nodes of the traversal path.

12. The system of claim 11, the value assigned to a node being determined using speed and angle coefficients determined for the node.

13. The system of claim 10, said one or more processors configured to create one or more segment trees being further configured to:

determine a geographic area about the smart via input point;

identify a plurality of segments using the determined geographic area;

for each of the one or more segment trees:

identify one of the plurality of segments as a root node of the segment tree using a determined distance of the segment from the destination point; and identify one or more nodes for the segment tree, each identified node corresponding to one of the plurality of segments having an aggregate direction to the destination point that satisfies an aggregate direction threshold.

14. The system of claim 13, wherein each segment of road has a ranking corresponding to a level of a road, said one or more processors configured to determine a geographic area about the smart via input point being further configured to:

determine a segment density for at least one of a plurality of levels of road and an initial geographic area about the smart via input point, the determined segment density for a level of road corresponding to a number of segments associated with the initial geographic area and having a ranking corresponding to the road level;

select a highest one of the levels of roads for which the determined segment density satisfies a density threshold corresponding to the level of road; and determine a segment density for each of a plurality of zone-determination geographic areas about the smart via input point, the segment density for a zone-determination geographic area corresponding to the number of segments associated with the zone-determination geographic area and having a ranking corresponding to the selected level of road; and determine the geographic area about the smart via input point using the zone-determination geographic areas that have a determined segment density that satisfies a zone-determination density threshold.

* * * * *